United States Patent
Olds et al.

(10) Patent No.: US 10,944,836 B2
(45) Date of Patent: Mar. 9, 2021

(54) DYNAMICALLY ADDRESSABLE NETWORK SERVICES

(71) Applicant: Vivint, Inc., Provo, UT (US)

(72) Inventors: J. T. Olds, Salt Lake City, UT (US); Alen Peacock, Orem, UT (US); Andrew Harding, American Fork, UT (US); Jeff Wendling, West Jordan, UT (US)

( * ) Notice: Subject to any disclaimer, the term of this patent is extended or adjusted under 35 U.S.C. 154(b) by 323 days.

(21) Appl. No.: 15/339,197

(22) Filed: Oct. 31, 2016

(65) Prior Publication Data

US 2018/0124188 A1 May 3, 2018

(51) Int. Cl.
  *H04L 29/08* (2006.01)
  *H04L 12/24* (2006.01)
  *H04L 29/12* (2006.01)

(52) U.S. Cl.
  CPC .......... *H04L 67/16* (2013.01); *H04L 41/5058* (2013.01); *H04L 67/02* (2013.01); *H04L 67/12* (2013.01); *H04L 41/5019* (2013.01); *H04L 61/1541* (2013.01); *H04L 61/2076* (2013.01); *H04L 61/2514* (2013.01)

(58) Field of Classification Search
  CPC ..... H04L 61/1541; H04L 67/02; H04L 67/16; H04L 67/12; H04L 43/18; H04L 61/1511; H04L 61/2503; H04L 67/18; H04L 41/5058
  See application file for complete search history.

(56) References Cited

U.S. PATENT DOCUMENTS

| | | | |
|---|---|---|---|
| 2009/0225760 A1* | 9/2009 | Foti | H04L 67/02 370/400 |
| 2014/0218517 A1* | 8/2014 | Kim | H04N 7/181 348/143 |
| 2014/0250006 A1* | 9/2014 | Makhotin | G06Q 20/3227 705/41 |
| 2016/0028607 A1* | 1/2016 | Weill | H04L 67/2842 709/224 |
| 2016/0165663 A1* | 6/2016 | Shanmugam | H04W 76/10 370/338 |
| 2016/0344745 A1* | 11/2016 | Johnson | H04L 63/08 |
| 2017/0346853 A1* | 11/2017 | Wyatt | G06F 21/577 |

* cited by examiner

*Primary Examiner* — Emmanuel L Moise
*Assistant Examiner* — Xiang Yu
(74) *Attorney, Agent, or Firm* — Workman Nydegger

(57) ABSTRACT

A computer system for optimizing bandwidth usage by directly linking two remote devices requests, from a local network gateway, a network port assignment for a services management component within a local network. The system also receives, at the services management component, a network connection directed towards the assigned network port. The network connection is received at the assigned network port regardless of the associated network protocol. The system then identifies a hostname within a data packet received through the network connection. The system also identifies, within a services registry, one or more services registered to receive network connections associated with the identified network protocol. In addition, the system identifies from the one or more services a particular service that is associated with the hostname. The system then forwards the network connection to the particular service.

20 Claims, 5 Drawing Sheets

DYNAMICALLY ADDRESSABLE NETWORK SERVICES

BACKGROUND

Computers and computing systems have affected nearly every aspect of modern living. Computers are generally involved in work, recreation, healthcare, transportation, entertainment, household management, etc.

Computing system functionality can be enhanced by a computing systems' ability to be interconnected to other computing systems via network connections. Network connections may include, but are not limited to, connections via wired or wireless Ethernet, cellular connections, or even computer-to-computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

In recent years, the Internet and associated Internet connected devices have proliferated at a tremendous rate. The phrase "Internet of Things" has been used to describe the integration of Internet connectivity into daily appliances and electronics within user's homes and lives. For example, Internet connectivity has been integrated into day-to-day appliances such as refrigerators, televisions, telephones, watches, clothing, and many other devices. The proliferation of these Internet connected devices has required innovative solutions within the fields of computer hardware, computer software, and computer networking.

As the market for the Internet of Things has expanded so have concerns about network security, bandwidth usage, and network stability. For instance, a single smart home may be associated with hundreds, or even thousands, of Internet connected devices, ranging from outlets and light switches to entertainment systems and security systems. This wide array of devices must properly communicate both within the local intranet of the home and remotely across the Internet.

In some embodiments, a particularly attractive feature of the Internet of Things is the ability for users to remotely manage various aspects of their household. For example, an Internet-connected thermostat may allow a user to adjust the temperature of his home while the user is away on vacation. Similarly, an Internet-connected entertainment system may allow a user to stream a video to his mobile phone, even though the video is stored within a storage device located at the user's home.

Service providers for the various components and appliances within the Internet of Things ecosystem must address and overcome several technical difficulties in order to provide cost-effective, stable, and secure service to their users. For example, significant technical challenges arise when simply trying to remotely access devices within a conventional home intranet. Most modern home intranets are behind a firewall, a DHCP server, a Network Address Translation (NAT), or some other system that obscures the local address of devices within the intranet.

Further, service providers must overcome many technical challenges and weigh many competing interests when determining how to serve content to their users. For instance, many service providers serve their users content through company owned or controlled servers. One of skill in the art will understand that the more content that a service provider serves through their own servers, the more bandwidth that the service provider must maintain and pay for and the more exposure a service provider has to their user's personal data.

As such, there is significant interest in addressing the technical challenges relating to network systems for securely and efficiently managing devices with an Internet of Things eco-system.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein include a computer system for optimizing bandwidth usage by directly linking two remote devices. The system includes one or more processors and one or more computer-readable media having stored thereon executable instructions that when executed by the one or more processors configure the computer system to perform various acts. For example, the system requests, from a local network gateway, a network port assignment for a services management component within a local network. Additionally, the system communicates, to a remote directory server, the assigned network port and an internet protocol address associated with the services management component. The system also receives, at the services management component, a network connection directed towards the assigned network port.

Additionally, the system identifies a network protocol associated with the network connection. The network connection is received at the assigned network port regardless of the associated network protocol. The system then identifies a hostname within a data packet received through the network connection. The system also identifies, within a services registry, one or more services registered to receive network connections associated with the identified network protocol. In addition, the system identifies from the one or more services a particular service that is associated with the hostname. The system then forwards the network connection to the particular service.

Additional or alternative disclosed embodiments include a computer-based method for optimizing bandwidth usage by directly linking two remote devices. The method includes receiving, at a user computing device, a command to interact with a particular remote service. The particular remote service communicates through a particular network protocol. Additionally, the method includes requesting, from a remote directory server, an internet protocol address and a port associated with a services management component. The method also includes generating, for communication to the services management component, a data packet that comprises an indication of the particular network protocol and a hostname that is associated with the particular remote service. Further, the method includes communicating, to the services management component, a network connection directed towards the internet protocol address and the port associated with the services management component. The network connection is directed towards the particular port regardless of the particular network protocol network protocol.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Disclosed embodiments provide methods and systems for devices and services within local intranets (referred to herein as "devices") to be accessed remotely. For example, disclosed embodiments allow devices to be accessed without requesting SSH and without being provisioned. Disclosed embodiments allow nodes, provisioned or not, to be accessible and addressable through the entirety of a network infrastructure, including across the Internet.

In at least one disclosed embodiment, a remote computing device is capable of directly accessing a variety of different services that are provided within a local area network. The services may each be associated with unique communication protocols and unique port assignments. Additionally, the remote computing device may communicate directly to the service, without requiring the use of a special-purpose server to forward the communications to the services.

Figure 1:
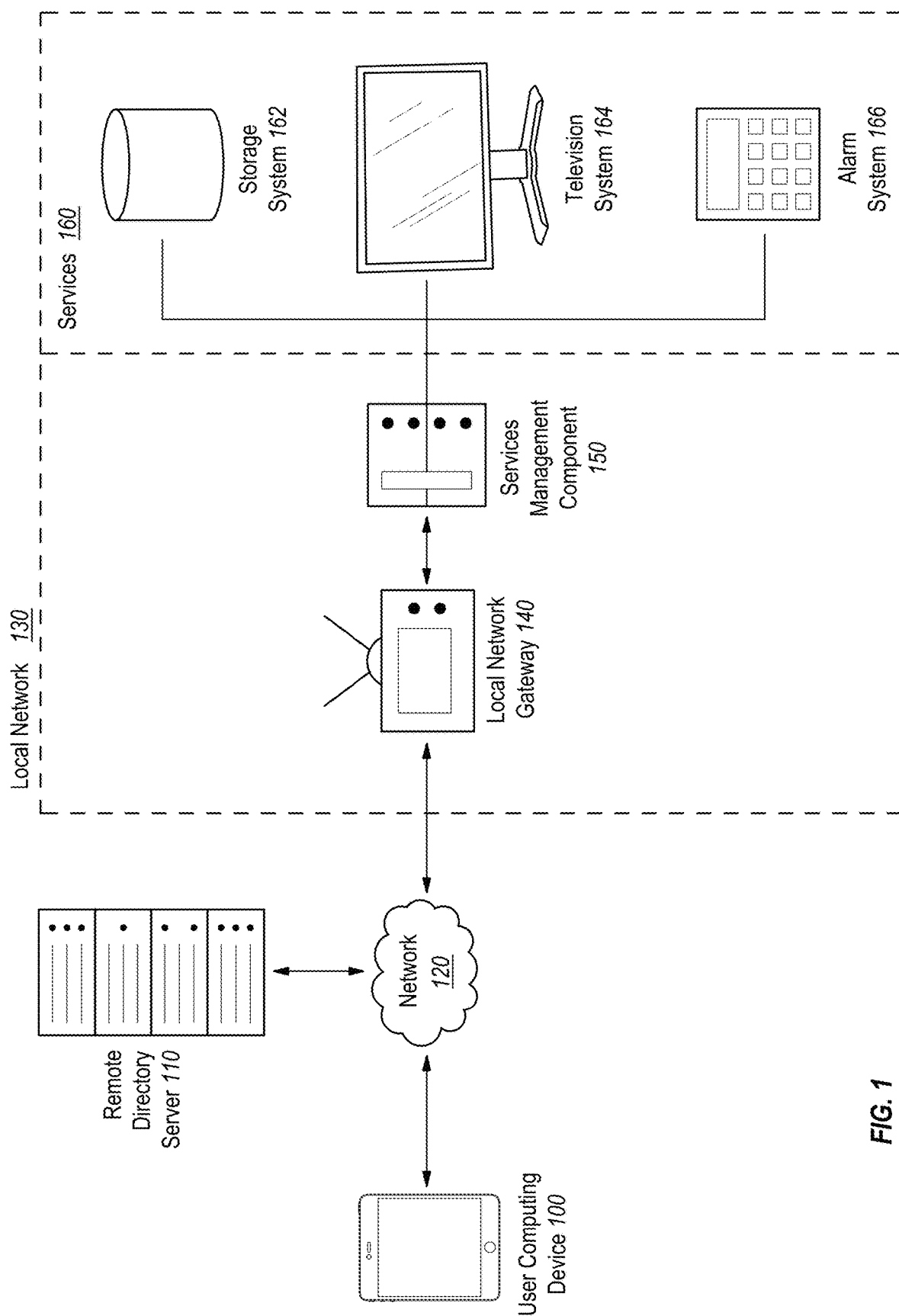
FIG. 1 illustrates a schematic of an embodiment of a system for optimizing bandwidth usage by directly linking two remote devices.

FIG. 1 illustrates a schematic of an embodiment of a system for optimizing bandwidth usage by directly linking two remote devices. In particular, FIG. 1 depicts a user computing device 100, a remote directory server 110, and a local network 130. The various devices and components are in communication through a network 120. In at least one embodiment, the user computing device 100 comprises a mobile phone, a mobile computer, a desktop computer, a server, an embedded device, or any other digital computing device capable of communicating over a network. The network connection 120 comprises a remote network connection such that user computing device 100 is not within the local network 130.

In at least one embodiment, the local network 130 comprises a local network gateway 140, such as a modem, that connects the local network 130 to the Internet. The local network 130 also comprises a services management component 150 that manages network communications between the network 120 and various services 160. The services 160 include, for example, storage systems 162, television systems 164, alarm systems 166, and other similar devices. In at least one embodiment, the services 160 comprise different components within a smart home, such as outlets, light switches, kitchen appliances, HVAC systems, and other similar household components.

The services management component 150 performs various functions for managing communications between the network 120 and various services 160. In at least one embodiment, the service management component 150 comprises a standalone device or a portion of a standalone device, that is connected to the local network 130 by the user. Further, in at least one embodiment, the service management component 150 is integrated within the local network gateway 140. In additional or alternative embodiment, the service management component 150 may comprise a software application that is executed on a computing device that is in communication with the local network 130.

The services management component 150 maintains a registry of services 160 available within the local network 130. Additionally, the services management component manages communications between the local network 130 and the remote director server 110, and in turn the services 160 and the user computing device 100. For example, in at least one embodiment, the services management component 150 listens on a TCP port for incoming connections of all kinds. The services management component 150 verifies that the port is reachable through a number of different protocols, including, but not limited to, UPnP, NATPNP, STUN, etc.

In at least one embodiment, the remote director server 110 provides external devices, such as the user computing device 110, with address information for accessing the local network gateway 140. For example, a user may be interested in activating a security alarm at his house. As such, the user may enter an activation command into the user computing device 100. In response to the command, the user computing device 100 communicates to the remote directory server 110 and requests internet address information associated with the local network gateway 140. The remote directory server 110 communicates the contact information to the user computing device 110. The user computing device 110 then communicates the command to the alarm system 166 through the local network gateway 140.

In at least one embodiment, multiple local networks (e.g., 130) are registered with the remote directory server 110. For example, multiple different users may have services management components (e.g., 150) within their respective homes. User computing devices (e.g., 100) associated with each user are capable of accessing the services 160 within their respective homes through the remote directory server 110. For instance, when communicating a request to the remote directory server 110, the user computing devices 110 may include identification information within the communicated data. The identification information may comprise identification information for the user computing device 100, the user, the local network 130, and/or the services management component 150. In at least one embodiment, the identification information comprises authentication credentials that verify the identity of the user. As such, in at least one embodiment, the remote directory server 110 provides multiple unique users with the ability to access services within their respective local networks 130.

Figure 2:
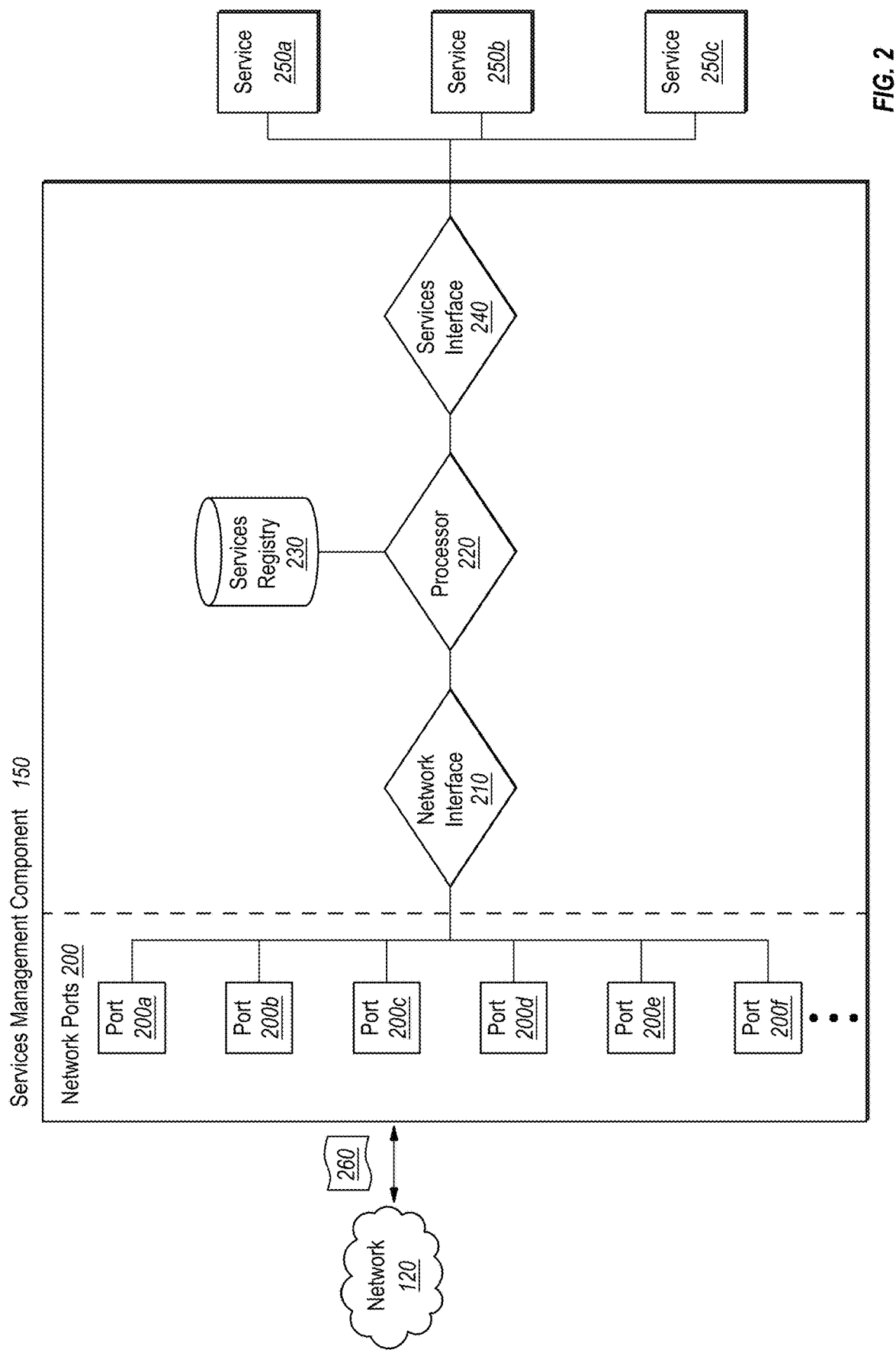
FIG. 2 illustrates a schematic of an embodiment of another system for optimizing bandwidth usage by directly linking two remote devices.

As such in various embodiments, the remote directory server 110 is in communication with multiple distinct services management components (e.g., 150). FIG. 2 illustrates a schematic of an embodiment of a services management component 150. In particular, the depicted services management component 150 comprises various network ports 200, a network interface 210, a processor 220, a services registry 230, and a services interface 240. The various depicted components of the services management component 150 may be implemented as software, as hardware, or as a combination thereof.

In at least one embodiment, a network interface 210 within the services management component 150 requests, from a local network gateway 140, a network port assignment within a local network. The port assignment may comprise assigning a particular port at the local network gateway 140 to be forwarded to the services management component 150. The services management component 150 may comprise a wide variety of ports 200 that can receive data communications. Upon receiving a port assignment, the network interface 210 may identify port 200a, for example, as the assigned port. In at least one embodiment, assigning a port to the services management component 150 comprises assigning the selected port (e.g., port 200a) to a local internet protocol ("IP") address associated with the services management component 150.

Once the services management component 150 has been assigned a port, the network interface 210 within the services management component 150 communicates, to a remote directory server 110, the assigned network port and a global IP address associated with the services management component 150. In at least one embodiment, the global IP address is the IP address associated with the local network gateway 140. As such, when communicating with the services management component 150, a remote device (e.g., the user computing device 100) retrieves the IP address and port number associated with the services management component 150 from the remote directory server 110. The remote device then communicates to the IP address associated with the local network gateway 140. The communication also comprises a destination port (e.g., 200a). Because port 200a has been assigned to the services management component 150, the local network gateway 140 forwards the received communication to the services management component 150.

For example, the services management component 150 may receive a network connection 260 directed towards the assigned network port. Upon receiving the network connection 260, a processor 220 (also referred to herein as a processing unit) within the services management component 150 identifies a network protocol associated with the network connection. The network protocol may comprise any standardized or custom network protocol. For example, the protocol may comprise TCP, SSH, SMB, FTP, HTTP, TLS PPP, or any number of other protocol types. In at least one embodiment, the network connection 260 is received at the assigned network port (e.g., port 200a) regardless of the associated network protocol.

The processor 220 identifies a hostname within a data packet received through the network connection 260. The hostname comprises an identifier that is associated with a particular service 250(a-c) (also depicted as services 160 in FIG. 1). In at least one embodiment, hostnames are not publicly published within the network 120, so a user computing device 100 that is communicating with the services management component 150 must be aware of the proper hostnames. Using the hostname, the processor 220 identifies, within the services registry 230, one or more services 250(a-c) registered to receive network connections 260 associated with the identified network protocol. Additionally, the processor 220 identifies, within the services registry 230, a particular service (e.g., service 250a) that is associated with the hostname. For example, the service registry 230 may comprise an entry that associates a particular hostname and network protocol with service 250a.

In at least one embodiment, upon identifying the service and network protocol associated with the hostname, the processor 220 converts the received data packet so that it matches the associated network protocol. For example, the user computing device 100 may send a network connection 260 that is directed towards service 250b. Service 250b may communicate using SSH. However, the user computing device 100 may place the communicated SSH data within a container, or otherwise manipulate the data, so that it can be communicated to the services management component 150 at the assigned port (e.g., port 220a).

In at least one embodiment, in order to communicate a wide variety of different network protocols to the same port, the user computing device 100 must manipulate the communicated data so that a wide variety of network protocols can be communicated to the same port. Accordingly, upon receiving the network connection 260 and identifying within the services registry 230 the network protocol that is associated with the received hostname, the processor 220 converts received data packets into a format that conforms with the identified network protocol. The services interface 240 then forwards the converted network connection to the identified service (e.g., service 250a).

In at least one embodiment, services 250(a-c) register with the services registry 230 by communicating registration data to the services interface 240. For example, the services interface 240 may comprise a Unix domain socket on which the services management component 150 listens for registration requests. In at least one embodiment a registration request comprises one or more of a virtual host name (i.e., hostname), a friendly service name, a particular protocol that is associated with the service 250a, an address for accessing the service 250a within a local area network 130, and whether or not it is the default handler for that protocol over the Unix domain socket. If the pair of host name and protocol are already registered, the processor 220 generates a failure notification and the registration fails.

Using the general methods described above, multiple different services (e.g., 250b, 250c) can also register within the service registry 230. Each respective service may utilize unique network protocols or networks protocols that are also used by other services. When a single network protocol is utilized by multiple different services, the hostname of each respective service is used to distinguish between the services. As such, the service management component 150 is capable of receiving, at a single port, network connections 260 that are directed towards different services, regardless of whether those services utilize the same or different network protocols.

For example, in at least one embodiment, when the service management component 150 receives a transmission control protocol ("TCP") connection, the processor 220 inspects it to see if it begins with a transport security layer ("TLS") client hello, normal http/1.1 header, or some other network protocols. If the incoming TCP connection is TLS, the service management component 150 inspects Server Name Indication ("SNI") records such as those found within the services registry 230 in order to forward the connection to the proper registered service. If no SNI registry is found, the default TLS service is chosen by the processor 220.

In contrast, if the incoming TCP connection is http/1.1, the processor 120 reads until a Host header in order to identify the proper registered service. If no Host header is sent before the double newline indicating the end of the request headers, the default http/1.1 service is chosen by the processor 220. In the case that no applicable default service is found, the processor 220 will generate a protocol-specific error.

In at least one embodiment, once a service (e.g., service 250a) has been identified, the service management component 150 forwards a file descriptor to the service 250, including the data the service management component 150 has read trying to determine the virtual host. The service 250a turns this file descriptor into a connection with the prefix to be read.

As described above, the service management component 150 also communicates to the remote directory server 110 the identities the service management component 150 is hosting services for. As used herein, identities are essentially (identity_type, identity) tuples, such as (harddrive, <hd_id>) or (volume, <vol_id>) or (device, <hw_id>) or (serviceman-agementcomponent, <servicemanagementcomponent_id>). The respective services 250(a-c) tell the service management component 150 what identities the service management component 150 should publish to the remote directory server 110 through a request to the local Unix domain socket. The request includes the SSL credentials required for the service management component 150 to make a request to that identity (private key, certificate, etc.).

In at least one embodiment, the service management component 150 requests a signed token from the remote directory server 110 that is tied to the service management component's identification. The service management component 150 then makes a request to the remote directory server 110 using an identity received from the remote directory server 110 during an identification request and the signed token. The remote directory server 110 then associates the requested identification with the service management component's id.

Additionally, in at least one embodiment, the service management component 150 is capable of collecting status information from the registered services 250(a-c). For example, the service management component 150 may send a request to the service 250(a-c) over the Unix domain socket without an attached file descriptor. An example request may comprise a request asking for a status payload. The requests are pipelined and support having multiple in flight requests. As such, in at least one embodiment, the requests comprise a request identification to identify the responses.

Figure 3:
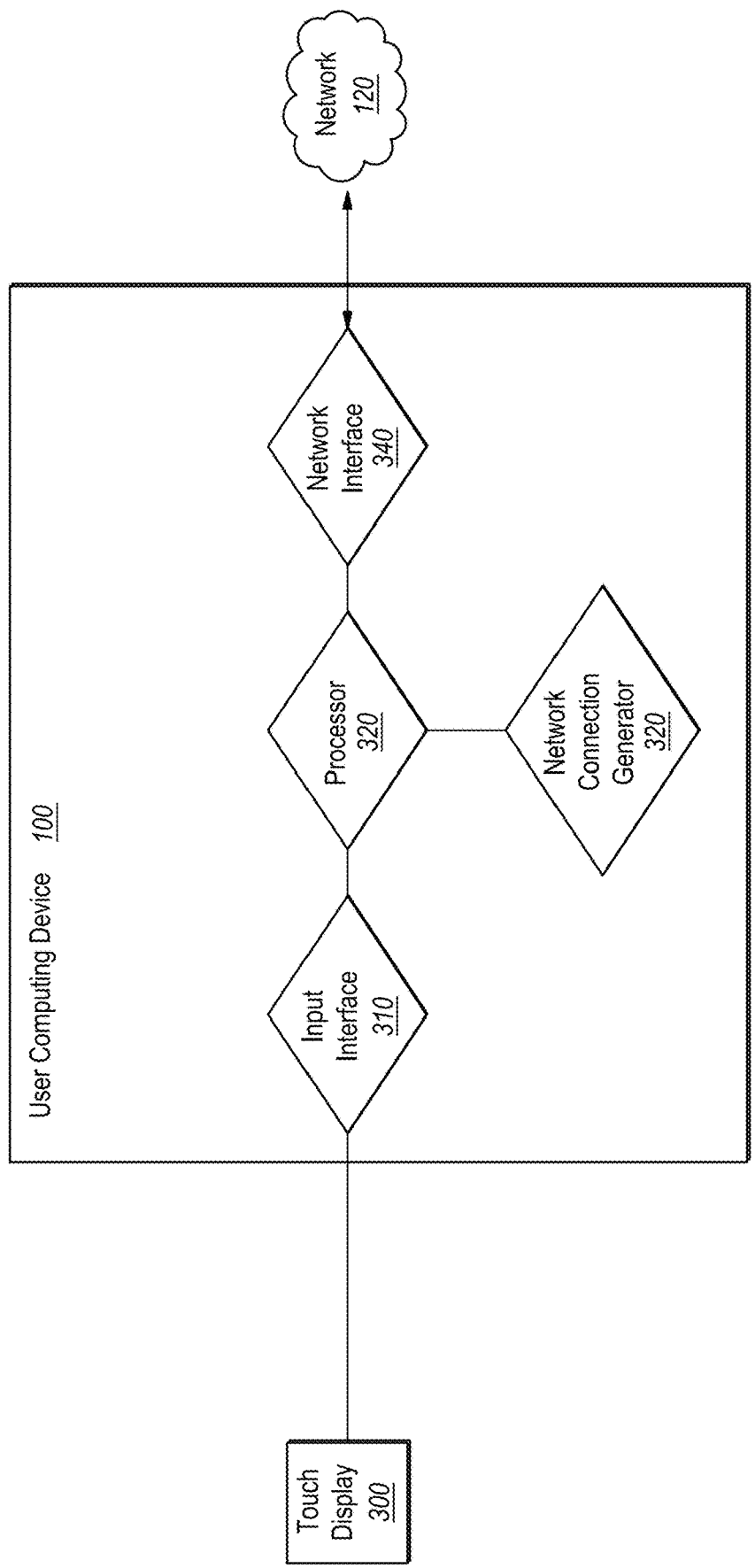
FIG. 3 illustrates a schematic of yet another embodiment of another system for optimizing bandwidth usage by directly linking two remote devices.

FIG. 3 illustrates a schematic of yet another embodiment of another system for optimizing bandwidth usage by directly linking two remote devices. In particular, FIG. 3 depicts a schematic diagram of an embodiment of a user computing device 100. The user computing device 100 comprises an input interface 310, a processor 320, a network connection generator 330, and a network interface 340.

In the depicted embodiment, the input interface 340 communicates with a touch display 300. The touch display 300 may comprise a touch screen within a smart phone, a touch screen on a personal computer, or a touch screen on any other computing device. One of skill in the art will understand that the touch display 300 is merely exemplary and that in alternate embodiments the input interface 300 may be in communication with any input devices, including but not limited to a keyboard, a mouse, voice control, gesture control, virtual keyboard, etc.

In the depicted embodiment, the network interface 340 communicates with network 120. The network interface 340 may comprise hardware and/or software elements for communicating with a WIFI network, a cellular network, a BLUETOOTH network, or any other network type. In at least one embodiment, the network interface 340 communicates at least to the remote directory server 110 and the local network 130.

The input interface 210 receives through the touch display 300 a command to interact with a particular remote service—for example, any of service 160. One will understand that the particular remote service communicates through a particular network protocol. For example, the alarm system 166 may communicate through a TLS network protocol.

Upon receiving the command, the network interface 340 within the user computing device 100 requests, from a remote directory server 110, an internet protocol address and a port associated with a services management component 150. In at least one embodiment, the remote directory server 110 is a publicly accessible server that maintains a listing of multiple services management components 150. For example, multiple different users may have service management components 150 installed at their respective houses. Each user may also have multiple different services 160 installed at their respective houses. Accordingly, in at least one embodiment, the remote directory server 110 maintains a network address and a port associated with each services management component 150. Additionally, in at least one embodiment, the remote directory server 110 also maintains a listing of services 160 associated with each respective services management component 150.

In at least one embodiment, the processor 320 within the user computing device 100 generates a data packet for communication to a particular service associated with the services management component 150. As used herein, generating a data packet comprises creating a group of one or more bits for communication over a network connection. A network communication comprises one or more generated data packets that comprise an indication of the particular network protocol and a hostname that is associated with the particular remote service. For example, in at least one embodiment, the particular remote service communicates using a particular network protocol—for example, SSH. However, the active port associated with the services management component 150 may comprise a port for receiving TLS communications.

As such, in order to communicate to the particular network services 160 through the services management component 150, it is necessary for the data packet to be formatted for TLS but contain information so that the data packet can be reformed into an SSH communication for processing by the particular network services. In at least one embodiment, the processor 320 generates a command for the particular network service in SSH. The processor 320 then wraps the SSH communication within a TLS communication scheme for communication to the services management component 150.

Once the communication is prepared, the network interface 340 communicates, to the services management component 150, a network connection directed towards the internet protocol address and the port associated with the services management component 150. As stated above, the network connection is directed towards the particular port regardless of the particular network protocol network protocol. Upon receiving the TLS data packet, the processor 220, within the services management component 150, identifies the TLS data packet as containing SSH elements. For example, the TLS data packet may comprise one or more data bits that indicate the presence of an SSH communication. The processor 220 then reforms the data communication into an SSH communication and prepares the SSH communication for forwarding to the particular network service. Additionally, the processor 220 identifies a hostname associated with the data communication and sends the communication to the proper service 250(*a-c*) as identified within the services registry 230.

Accordingly, in at least one embodiment, a user computing device 100 establishes a network communication directly with a services management component 150, even when the services management component 150 is within behind a NAT (or something network obfuscation) within a local area network. Additionally, the user computing device 100 communicates to a specific port associated with the services management component 150 without regard to the protocol associated with the actual command.

As such, disclosed embodiments provide significant security benefits by connecting user devices directly to the user's services, without requiring the information to travel through a centralized server. Similarly, disclosed embodiments provide significant bandwidth benefits by eliminating a bottleneck at a centralized server that handles all communications. Instead, user devices are connected directly to the user's services.

One will appreciate that embodiments disclosed herein can also be described in terms of flowcharts comprising one or more acts for accomplishing a particular result. For example, FIGS. 4 and 5 and the corresponding text describe acts in various methods and systems for optimizing bandwidth usage by directly linking two remote devices. The acts of FIGS. 4 and 5 are described below.

Figure 4:
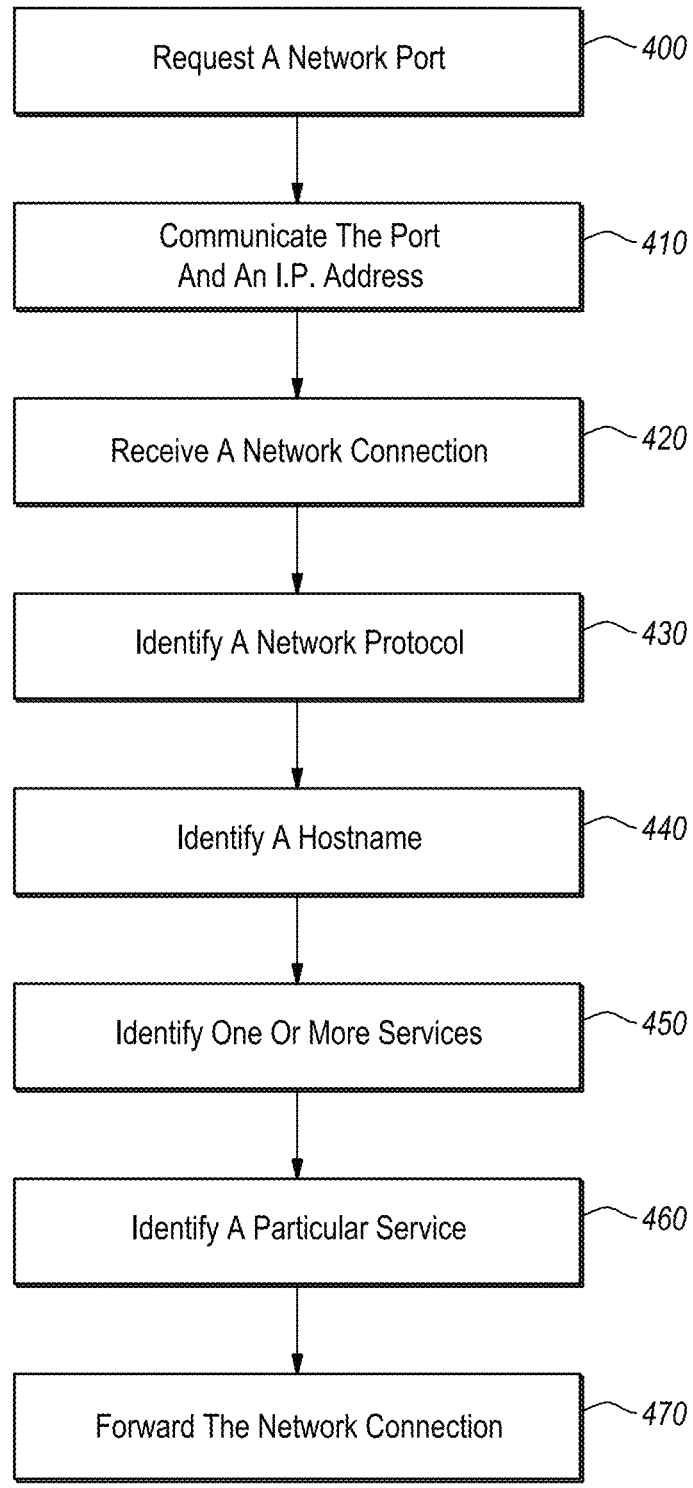
FIG. 4 illustrates a flow chart of an embodiment of a method for optimizing bandwidth usage by directly linking two remote devices.
Figure 5:
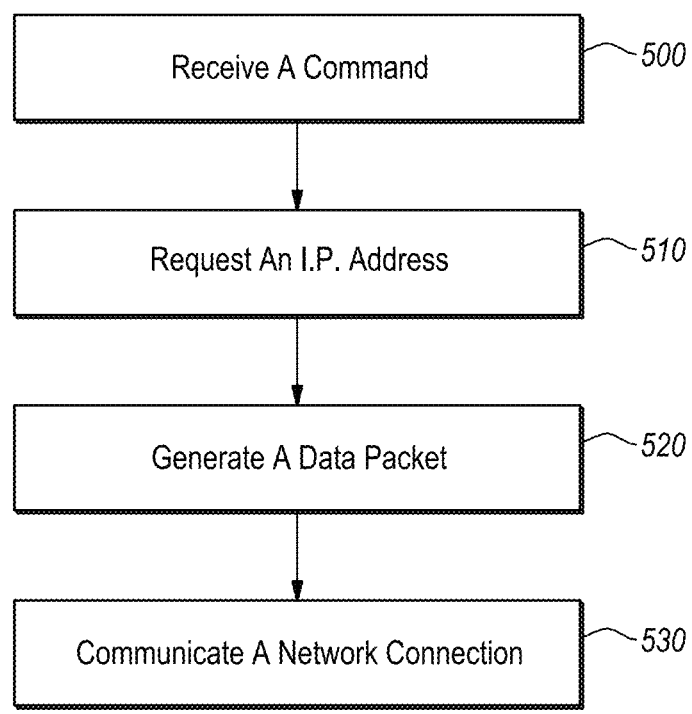
FIG. 5 illustrates a flow chart of an embodiment of another method for optimizing bandwidth usage by directly linking two remote devices.

For example, FIG. 4 illustrates that a flowchart for an embodiment of a method for optimizing bandwidth usage by directly linking two remote devices can comprise an act 400 of requesting a network port. Act 400 includes request, from a local network gateway, a network port assignment for a services management component within a local network. For example, as depicted and described with respect to FIG. 1, a services management component 150 requests from a local network gateway 140 a port that is assigned to the services management component 150. For instance, the port may be established using UPnP.

FIG. 4 also illustrates that the method comprises an act 410 of communicating the port and an IP address. Act 410 includes communicating, to a remote directory server 110, the assigned network port and an internet protocol address associated with the services management component 150. For example, as depicted and described with respect to FIG. 1, the services management component 150 registers its port and IP address with the remote directory server 110. The remote directory server 110 may be maintained by the same entity that provides the services management component 150.

Additionally, FIG. 4 illustrates that the method comprises an act 420 of receiving a network connection. Act 420 includes receiving, at the services management component, a network connection directed towards the assigned network port. For example, as depicted and described with respect to FIG. 2, the services management component 150 receives a communication 260 (i.e., a command) through a particular port 200.

FIG. 4 illustrates that the method comprises an act 430 of identifying a network protocol. Act 430 includes identifying a network protocol associated with the network connection. The network connection is received at the assigned network port regardless of the associated network protocol. For example, as depicted and described with respect to FIG. 2, the processor 220 within the services management component parses the communication 260 and identifies a network protocol associated with the network connection. In at least one embodiment, the identified network protocol is different than the protocol of the actual communication. For example, the communication may be an SSH communication, but the identified protocol may comprise SSL.

In addition, FIG. 4 illustrates that the method comprises an act 440 of identifying a hostname. Act 440 includes identify a hostname within a data packet received through the network connection. For example, as depicted and described with respect to FIG. 2, the processor 220 within the services management component parses the communication 260 and identifies a hostname that the communication is directed towards.

FIG. 4 also illustrates that the method comprises an act 450 of identifying one or more services. Act 450 includes identifying, within a services registry, one or more services registered to receive network connections associated with the identified network protocol. For example, as depicted and described with respect to FIG. 2, the processor 220 queries the services registry 230 for services that are registered for receiving the identified protocol.

Further, FIG. 4 illustrates that the method comprises an act 460 of identifying a particular service. Act 460 includes identifying from the one or more services, a particular service that is associated with the hostname. For example, as depicted and described with respect to FIG. 2, the processor 220 identifies form the services registered within the services registry 230, a services that is registered as being associated with the received hostname.

Further still, FIG. 4 illustrates that the method comprises an act 470 of forwarding the network connection 470. Act 470 includes forwarding the network connection to the particular service. For example, as depicted and described with respect to FIG. 2, the services interface 240 forwards the communication 260 to the appropriate service 250(a-b).

FIG. 5 illustrates a flow chart of an embodiment of another method for optimizing bandwidth usage by directly linking two remote devices. In particular, FIG. 5 illustrates that a method comprises an act 500 of receiving a command. Act 500 includes receiving, at a user computing device, a command to interact with a particular remote service. The particular remote service communicates through a particular network protocol. For example, as depicted and described with respect to FIG. 1, a user computing device 100 receives a command that is directed towards a service within a local network 130. For example, the user computing device 100 may receive a command to activate an alarm system 166.

FIG. 5 also shows that the method includes an act 510 of requesting an IP address. Act 510 comprises requesting, from a remote directory server, an internet protocol address and a port associated with a services management component. For example, as depicted and described with respect to FIG. 1, the user computing device 100 requests from the remote directory server 110 an IP address and port associated with the services management component 150 that is further associated with the alarm system 166.

Additionally, FIG. 5 shows that the method includes an act 520 of generating a data packet. Act 520 comprises generating, for communication to the services management component, a data packet that comprises an indication of the particular network protocol and a hostname that is associated with the particular remote service. For example, as depicted and described with respect to FIG. 3, the processor 320 creates a data packet that comprises an indication of the particular network protocol and hostname of the target service (e.g., the alarm system 166). In at least one embodiment, this includes the processor 320 wrapping the desired particular communication protocol into a second protocol that the services management component 150 is configured to receive.

Further, FIG. 5 shows that the method includes an act 530 of communicating a network connection. Act 530 comprises communicating, to the services management component, a network connection directed towards the internet protocol address and the port associated with the services management component. The network connection is directed towards the particular port regardless of the particular network protocol network protocol. For example, as depicted and described with respect to FIGS. 1 and 3, the network interface 340 communicates the network connection to a particular port at the local network gateway 140, without regard to the network protocol that is typically associated with the port. For instance, the network interface 340 may communicate an SSH command to a port that is typically associated with SSL protocols. In at least one embodiment, the SSH command is wrapped within an SSL protocol.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for optimizing bandwidth usage by directly linking two remote devices, comprising:
    one or more processors; and
    one or more computer-readable media having stored thereon executable instructions that when executed by the one or more processors configure the computer system to perform at least the following:
    request, at a services management component and from a local network gateway, an assigned network port for the services management component within a local network;
    communicate, from the services management component and to a remote directory server, the assigned network port and an internet protocol address associated with the services management component;
    receive, at the services management component from a user computing device, a network connection directed towards the assigned network port, wherein the network connection is generated by the user computing device and does not travel through the remote directory server prior to being received by the services management component;
    identify, at the services management component, a particular protocol associated with the network connection, wherein the network connection is received at the assigned network port regardless of the particular protocol; and
    identify, within a services registry that is stored at the services management component, multiple services registered to receive network connections associated with the particular protocol, wherein the services registry comprises:
        a service-specific default indicator that indicates that a particular service selected from the multiple services is a default service for the particular protocol;
    determine, at the services management component, that no hostname is present within a data packet received through the network connection;
    identify, at the services management component, the default service that is associated with the particular protocol; and
    forward, from the services management component, the network connection to the default service.

2. The computer system of claim 1, wherein the executable instructions include instructions that are executable to configure the computer system to:
    receive, at the services registry, a registration request from a first service, wherein the registration request comprises:
        a first network protocol for communicating with the first service,
        a first hostname associated with the first service, and
        a first address for accessing the first service within a local area network, wherein the local area network also includes the services management component.

3. The computer system of claim 2, wherein the executable instructions include instructions that are executable to configure the computer system to:
    receive, at the services registry, a registration request from a second service, wherein the registration request comprises:
        a second network protocol for communicating with the second service,
        a second hostname associated with the second service, and
        a second address for accessing the second service within the local area network,
    wherein the local area network also includes the services management component; and
    wherein the first network protocol and the second network protocol are different types of network protocols.

4. The computer system of claim 3, wherein identifying a network protocol associated with the network connection comprises:
    when receiving a first network connection directed towards the first service, identify the first network protocol;
    when receiving a second network connection directed towards the second service, identify the second network protocol; and
    wherein both the first network connection and the second network connection are received at the assigned network port.

5. The computer system of claim 1, wherein the executable instructions include instructions that are executable to configure the computer system to:
    receive, at the user computing device, a command to interact with a particular remote service, wherein the particular remote service communicates through the particular protocol;

request, from the remote directory server, the internet protocol address and the assigned network port associated with the services management component;

generate, for communication to the services management component, the data packet that comprises an indication of the particular protocol that is associated with the particular remote service; and communicate, to the services management component, a network connection directed towards the internet protocol address and the assigned network port associated with the services management component, wherein the network connection is directed towards the assigned network port regardless of the particular protocol.

6. The computer system of claim 1, wherein the executable instructions include instructions that are executable to configure the computer system to:

when the particular protocol comprises a Transport Layer Security (TLS) connection, inspect Server Name Indication (SNI) records to identify a hostname; and when no corresponding SM record is found, forward the network connection to a default TLS service.

7. The computer system of claim 1, wherein the executable instructions include instructions that are executable to configure the computer system to:

when the particular protocol comprises a hypertext transfer protocol (HTTP) connection, inspect a host header to identify a hostname; and when no corresponding hostname is found, forward the network connection to a default HTTP service.

8. The computer system of claim 1, wherein the executable instructions include instructions that are executable to configure the computer system to:

communicate, to the remote directory server, information corresponding with the multiple services within the services registry.

9. A computer-based method for optimizing bandwidth usage by directly linking two remote devices, comprising:

receiving, at a user computing device, a command to interact with a particular remote service, wherein the particular remote service communicates through a particular network protocol;

requesting, at the user computing device and from a remote directory server, an internet protocol address and an assigned port associated with a services management component;

generating, at the user computing device and for communication to the services management component, a data packet that comprises an indication of the particular network protocol that is associated with the particular remote service; and communicating, from the user computing device to the services management component, a network connection directed towards the internet protocol address and the assigned port associated with the services management component, wherein:

the network connection is directed towards the assigned port regardless of the particular network protocol, the network connection does not travel through the remote directory server prior to being received by the services management component, and the services management component is configured to:

access, within a services registry, one or more services registered to receive network connections associated with the particular network protocol, wherein the services registry comprises a service-specific default indicator that indicates that a particular service selected from multiple services is a default service for a particular protocol;

determine that no hostname is present within the data packet received through the network connection;

identify the default service that is associated with the particular network protocol; and forward the network connection to the default service.

10. The computer-based method as recited in claim 9 further comprising:

requesting, from a local network gateway, the assigned port for the services management component within a local network;

communicating, to the remote directory server, the assigned port and the internet protocol address associated with the services management component;

receiving, at the services management component, a network connection directed towards the assigned port;

identifying the particular network protocol associated with the network connection, wherein the network connection is received at the assigned port regardless of the particular network protocol; and accessing, within the services registry, the multiple services registered to receive network connections associated with the particular network protocol, wherein the services registry comprises:

the service-specific default indicator that indicates that the particular service selected from the multiple services is the default service for the particular network protocol;

determining that no hostname is present within the data packet received through the network connection;

identifying the default service that is associated with the particular network protocol; and forwarding the network connection to the default service.

11. The computer-based method as recited in claim 9 wherein the user computing device comprises a smart phone communicating over a cellular network.

12. The computer-based method as recited in claim 11 wherein the particular remote service comprises an alarm system within a house.

13. The computer-based method as recited in claim 11 wherein generating the data packet comprises generating the data packet to conform to a first network protocol that is different than the particular network protocol.

14. A computer-based method for optimizing bandwidth usage by directly linking two remote devices, comprising:

requesting, at a services management component and from a local network gateway, an assigned network port for a services management component within a local network;

communicating, from the services management component and to a remote directory server, the assigned network port and an internet protocol address associated with the services management component;

receiving, at the services management component from a user computing device, a network connection directed towards the assigned network port, wherein the network connection is generated by the user computing device and does not travel through the remote directory server prior to being received by the services management component;

identifying, at the services management component, a particular network protocol associated with the network connection, wherein the network connection is received at the assigned network port regardless of the particular network protocol; and accessing, within a services registry that is stored at the services management component, multiple services registered to receive network connections associated with the particular network protocol, wherein the services registry comprises:
- a service-specific default indicator that indicates that a particular service selected from the multiple services is a default service for the particular network protocol;

determining, at the services management component, that no hostname is present within a data packet received through the network connection;

identifying, at the services management component, the default service that is associated with the particular network protocol; and forwarding, from the services management component, the network connection to the default service.

15. The computer-based method of claim 14, further comprising:
receiving, at the services registry, a registration request from a first service, wherein the registration request comprises:
- a first network protocol for communicating with the first service,
- a first hostname associated with the first service, and
- a first address for accessing the first service within a local area network, wherein the local area network also includes the services management component.

16. The computer-based method of claim 15, further comprising:
receiving, at the services registry, a registration request from a second service, wherein the registration request comprises:
- a second network protocol for communicating with the second service,
- a second hostname associated with the second service, and
- a second address for accessing the second service within the local area network, wherein the local area network also includes the services management component; and wherein the first network protocol and the second network protocol are different types of network protocols.

17. The computer-based method of claim 16, further comprising: when receiving a first network connection directed towards the first service, identifying the first network protocol;
when receiving a second network connection directed towards the second service, identifying the second network protocol; and
wherein both the first network connection and the second network connection are received at the assigned network port.

18. The computer-based method of claim 14, further comprising:
when the particular network protocol comprises a Transport Layer Security (TLS) connection, inspect Server Name Indication (SNI) records to identify a hostname; and
when no corresponding SM record is found, forward the network connection to a default TLS service.

19. The computer-based method of claim 14, further comprising:
when the particular network protocol comprises a hypertext transfer protocol (HTTP) connection, inspect a host header to identify a hostname; and
when no corresponding host header is found, forward the network connection to a default HTTP service.

20. The computer-based method of claim 14, further comprising: communicate, to the remote directory server, information corresponding with the multiple services within the services registry.

* * * * *